United States Patent [19]
Bird et al.

[11] 3,753,436
[45] Aug. 21, 1973

[54] AUTOMATIC RESPIRATOR

[76] Inventors: Forrest M. Bird, Mark 7, Palm Springs, Calif. 92262; Henry L. Pohndorf, 1227 Brewster Street, El Cerrito, Calif. 94530

[22] Filed: Feb. 16, 1971

[21] Appl. No.: 115,225

Related U.S. Application Data

[63] Continuation-in-part of Ser. No. 26,023, April 6, 1970, abandoned.

[52] U.S. Cl. .............................................. 128/145.8
[51] Int. Cl............................................ A61m 16/00
[58] Field of Search ............ 128/145.8, 145.5–145.7, 128/142–142.4, 145, 146, 185, 186, 191, 195, 194

[56] References Cited
UNITED STATES PATENTS

| | | | |
|---|---|---|---|
| 3,068,856 | 12/1962 | Bird et al. | 128/145.5 |
| 3,234,932 | 2/1966 | Bird et al. | 128/145.6 |
| 3,114,365 | 12/1963 | Franz | 128/145.8 |

*Primary Examiner*—Richard A. Gaudet
*Assistant Examiner*—G. F. Dunne
*Attorney*—Flehr, Hohbach, Test, Albritton & Herbert

[57] ABSTRACT

Respiratory apparatus for controlling the flow of gases to a patient's airway. In one embodiment a light weight, portable, reliable and ethical respirator apparatus adapted for home use or the like is provided. A servo flow control affords convenient and accurate adjustment of sensitivity pressures and peak inspiratory pressures. The elements are constructed in a manner facilitating disassembly, sterilization, and assembly by a relatively unskilled person. The respirator is adapted to freely operate under adverse conditions without being affected by an accumulation of moisture. In another embodiment the respirator apparatus includes means facilitating accurate manual adjustment of the peak inspiratory pressure limit in a manner which does not alter the pre-set sensitivity level.

22 Claims, 8 Drawing Figures

INVENTORS
Forrest M. Bird
BY Henry L. Pohndorf
Flehr, Hohbach, Test,
Albritton & Herbert
Attorneys INVENTORS
Forrest M. Bird
Henry L. Pohndorf
BY
Flehr, Hohbach, Test,
Albritton & Herbert
Attorneys

AUTOMATIC RESPIRATOR

CROSS REFERENCE TO RELATED APPLICATION

This application is a Continuation-in-Part of Application Ser. No. 26,023 (now abandoned) filed Apr. 6, 1970 by the applicants herein.

BACKGROUND OF THE INVENTION

Respiratory apparatus have previously been provided for cardiopulmonary therapy. These respirators have provided automatic control of functions such as sensitivity and inspiratory pressures for therapeutic management of many pulmonary diseases and conditions. The prior art respirators have been relatively complex and large in size to provide the full range of automatic and manual features for professional hospital use, for example. However, the need has been recognized for a light weight, portable, reliable and ethical respiratory apparatus which may be used in a home, hospital, or clinic by a relatively unskilled person and yet provide the more important operating features of the conventional respirators now used in hospitals.

Multiple use in a hospital is enhanced if only part of the respirator system is contaminated. Thus, it is less expensive to have one respirator control device and many breathing heads. This enables almost continual use of an individual respirator on various patients by changing the breathing heads. Accordingly, the need has been recognized for respirator apparatus of the type described in which the breathing head elements such as the nebulizer, exhalation valve and mouthpiece which are to be used by individual patients can be interchanged for operation with a single gas control device. A further need is for respirator apparatus of the type described in which either of the sensitivity or peak inspiratory pressure settings can be adjusted without altering the remaining setting.

SUMMARY OF THE INVENTION AND OBJECTS

It is the object of the present invention to provide an improved respiratory apparatus of the type described for use in cardiopulmonary therapy.

Another object is to provide a light weight, portable, reliable and ethical respiratory apparatus for use in the home, hospital or clinic by a relatively unskilled person.

Another object is to provide a respiratory apparatus of the type described which is readily disassembled, sterilized, and then assembled by a relatively unskilled person.

Another object is to provide a cardiopulmonary therapy device of the type described with a gas flow control valve having simplified elements in a relatively small and compact assembly providing convenient and simplified adjustment of the sensitivity and peak inspiratory pressures as well as the inspiratory phase length.

Another object is to provide a cardiopulmonary therapy device having a respirator servo control with a valve element constructed and funtioning in a manner obviating problems of sluggishness or malfunctions under adverse operating conditions, such as moisture accumulation.

Another object is to provide a servo control valve for a respirator of the type described providing adjustable sensitivity and peak inspiratory pressures controlled by means of a central magnet attracting sensitivity and pressure armature plates both axially adjustable with respect to a valve operating shaft.

Another object is to provide a respiratory servo control valve providing separate finger-tip adjustment of sensitivity and peak inspiratory pressures by means of calibration wheels threadably engaging a pair of shafts mounted for movement with a valve operating member, and with the shafts adjustably positioned during installation for coordination of the relative calibration positions of the wheels.

Another object is to provide respiratory apparatus of the type described in which interchangeable breathing head assemblies, including for example a nebulizer, exhalation valve and mouthpiece, are usable by multiple patients with a single apparatus controlling gas-flow rates and the cycling of the inspiratory and expiratory phases.

Another object is to provide respiratory apparatus of the type described affording independent adjustment of either sensitivity or peak inspiratory pressure limits without altering the remaining pressure settings.

Another object is to provide respiratory apparatus of the type described affording convenient and accurate manual adjustment of sensitivity and peak inspiratory pressures with means for manual cycling of the inspiratory and expiratory phases as desired.

Another object is to provide an improved respirator apparatus of the type disclosed in applicants' copending applications Ser. Nos. 772,346 filed Oct. 31, 1968 and 852, 186 filed Aug. 22, 1969.

This invention broadly provides improved respirator apparatus for cardiopulmonary therapy and the like. In one embodiment a relatively light-weight, portable, reliable and ethical device is provided for use in the home, hospital, or clinic by a relatively unskilled person. In another embodiment a single gas control device usable with interchangeable breathing head assemblies provides independent adjustment of sensitivity and peak inspiratory pressure level settings.

Gas under pressure is directed through a flow and relief valve assembly adjacent the pressure source through tubing and into a servo control valve. A separate flow rate control on the servo valve both meters gas flow and also provides on-off valving of the gas flow upstream of a control valve element. The control valve element is actuated by a central shaft operating to open the valve element responsive to a selected sensitivity pressure in the breathing head assembly for initiation of the inspiratory phase, and to close the valve element responsive to a selected peak inspiratory pressure for initiation of the expiratory phase. The valve element is adapted for trouble-free operation in the gas flow path, even under adverse moisture conditions, while the central shaft does not move in this flow path. A central magnet is positioned between a pair of armature plates mounted on respective calibration wheels, adjustable with respect to the central shaft, for selective adjustment of the sensitivity and peak inspiratory pressures. The calibration wheels are threadably mounted for rotation on respective sensitivity and pressure shafts each having a varied thread pitch effective to adjust the respective pressures in relative proportion to movement of the calibration wheel. The sensitivity and pressure shafts are adjustable with respect to angular positioning on the central shaft for coordination of their relative calibration positions. The control valve element includes a tapered valve head and elongated shaft of non-corrosive material moving to and from a line contact valve seat for opening and closing the gas flow to the venturi assembly, gate valve assembly, and nebulizer in the breathing head assembly. In the embodiment affording independent adjustment of the sensitivity and pressure level settings, adjustable stop means are provided to limit outward excursion of the central shaft.

DESCRIPTION OF THE PREFERRED EMBODIMENT

Figure 1:
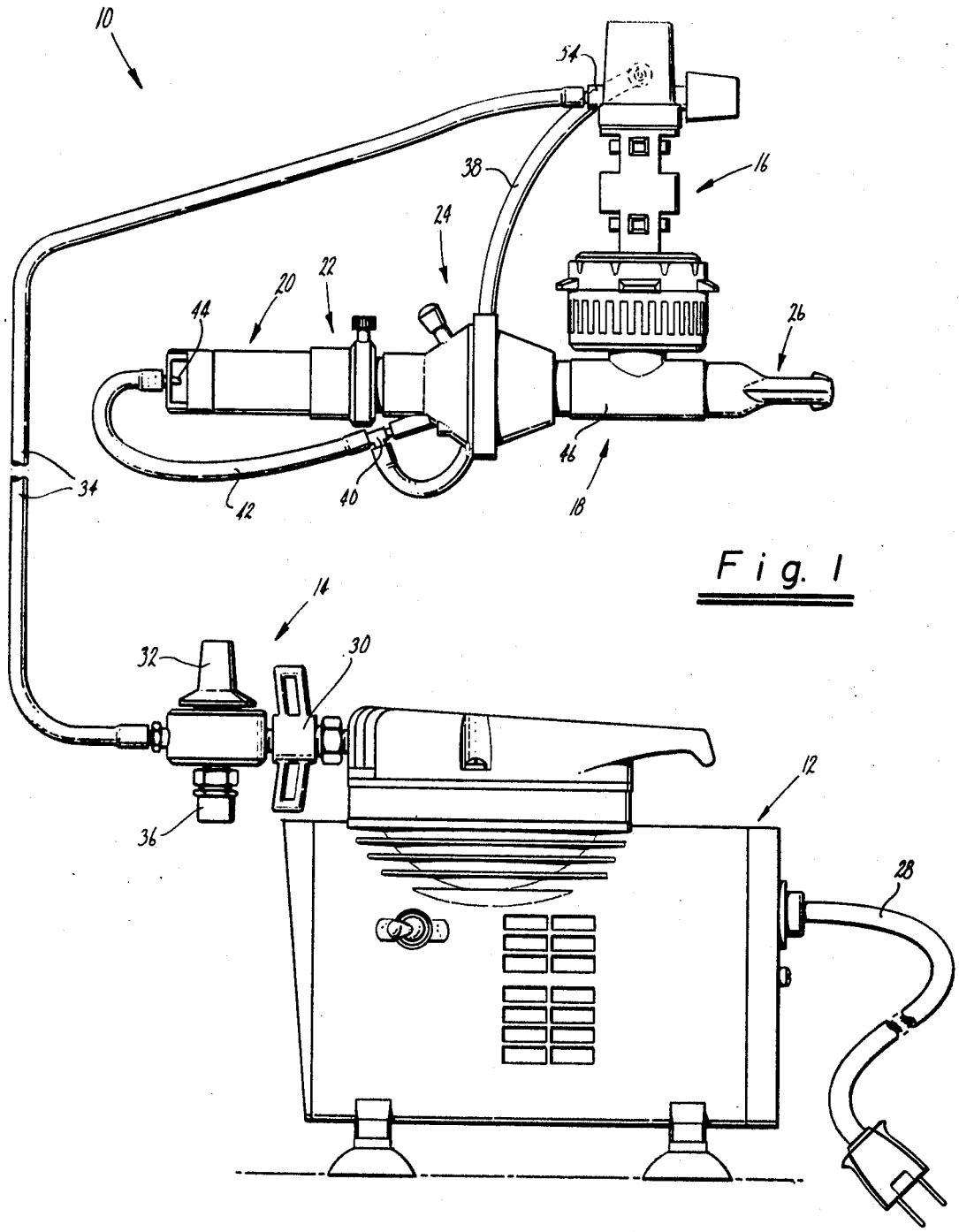
FIG. 1 is a side elevational view of one preferred embodiment of the invention shown connected to a source of positive pressure.

Referring to the drawings and particularly FIG. 1 an embodiment of the invention comprising a relatively small and light weight respirator unit for use in cardiopulmonary therapy is illustrated generally at 10. The respirator unit 10 includes a source of positive pressure 12 which directs pressurized air into master or primary flow rate and relief valve assembly 14, servo control valve assembly 16, and breathing head assembly 18 which in turn includes a venturi assembly 20, gate valve assembly 22, micro-nebulizer 24, and mouthpiece 26 adapted for connection to the patient's airway. Other configurations may be provided for adapting the unit to a mask or tracheotomy fitting.

Details of the source of pressure 12, valve assembly 14, and breathing head assembly 18 are explained in greater detail in U.S. Pat. Nos. 3,584,621 and 3,630,196. Suffice it to say here that pressure source 12 preferably comprises a diaphragm type compressor operated by a source of electrical power from cord 28 connected with a suitable power receptacle, not shown. The compressor directs the pressurized air or gas into master flow rate and relief valve assembly 14 through wingnut fitting 30.

Master flow rate and relief valve assembly 14 includes a control valve assembly 32 adapted to control the flow of gas from the compressor into tubing 34. A relief valve assembly 36 is provided to relieve gas overpressure in the valve assembly.

Servo control valve 16 receives the pressurized gas from tubing 34 and directs it during a controlled inspiratory phase through tubing 38 into Tee 40. The Tee divides the flow into a main air stream going to tubing 42 connected with the venturi assembly and a branch stream going to micro-nebulizer 24.

Venturi assembly 20 delivers the main air stream to the micro-nebulizer 24 and comprises a nozzle 44 directing a jet of gas into a venturi-like passage extending through the body of the venturi assembly.

The outlet end of the venturi assembly is connected with gate valve assembly 22. This valve comprises a main passage having a one-way spring loaded valve member, not shown, adapted to prevent exhalation gases from reversely flowing into the nebulizer or venturi during the exhalation phase. During the inhalation phase the gate valve 22 is opened by the entrained flow of gas issuing from venturi 20, and this gas is directed into micronebulizer 24.

Micronebulizer 24 preferably is of the type generally described in U.S. Pat. No. 3,172,406. As described therein, micro-nebulizer 24 comprises a reservoir of the liquid to be aspirated and nebulized in a main flow passage connected between gate valve 22 and Tee 46. A ball, not shown, within this passage breaks up the aspirated liquid into small particles which are entrained in the main air stream flowing through the mouthpiece to the patient.

Figure 2:
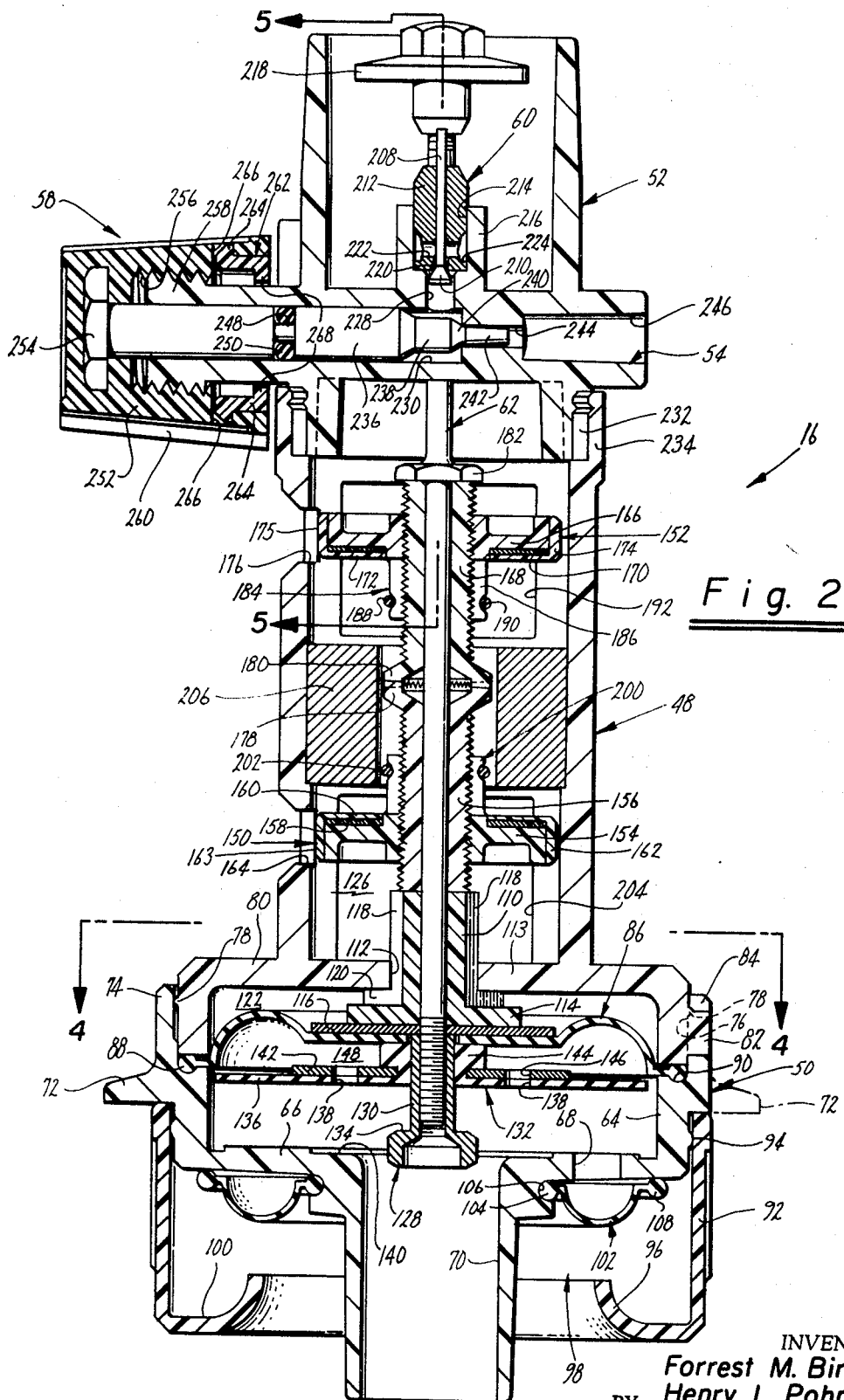
FIG. 2 is an axial section view of the servo control valve assembly of the device in FIG. 1, shown disassembled therefrom.
Figure 5:
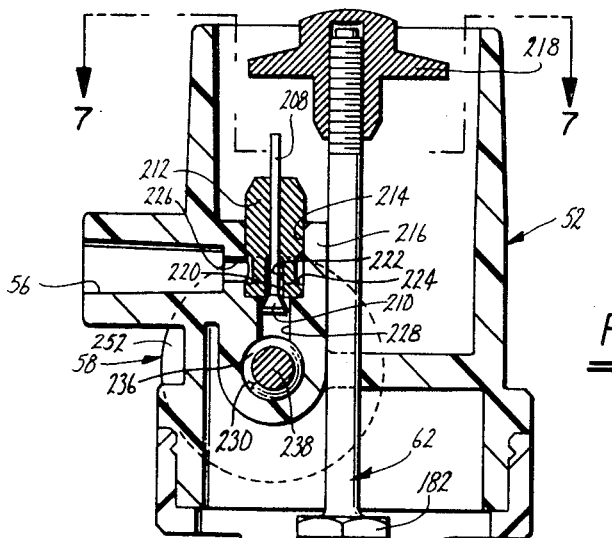
FIG. 5 is a partial axial section taken along the line 5—5 of FIG. 2.

FIG. 2 illustrates in greater detail the features of servo control valve assembly 16 which is adapted for mounting at its lower end with the side branch of Tee 46 on breathing head assembly 18. Valve assembly 16 comprises a main housing 48 mounting at its lower end an exhalation bell 50 and at its upper end a control body assembly 52. Control body assembly 52 includes an inlet 54 adapted for connection with tubing 34 supplying the pressurized gas from the compressor. FIG. 5 illustrates outlet 56 on he control body assembly adapted for connection with tubing 38. Gas flow through tubing 38 is under control of flow rate and metering valve assembly 58 and phase control valve assembly 60.

Phase control valve assembly 60 in turn is operated by means of central shaft or valve operating assembly 62 mounted for axial sliding movement within main housing 48 responsive to sensitivity and peak inspiratory pressures.

Figure 3:
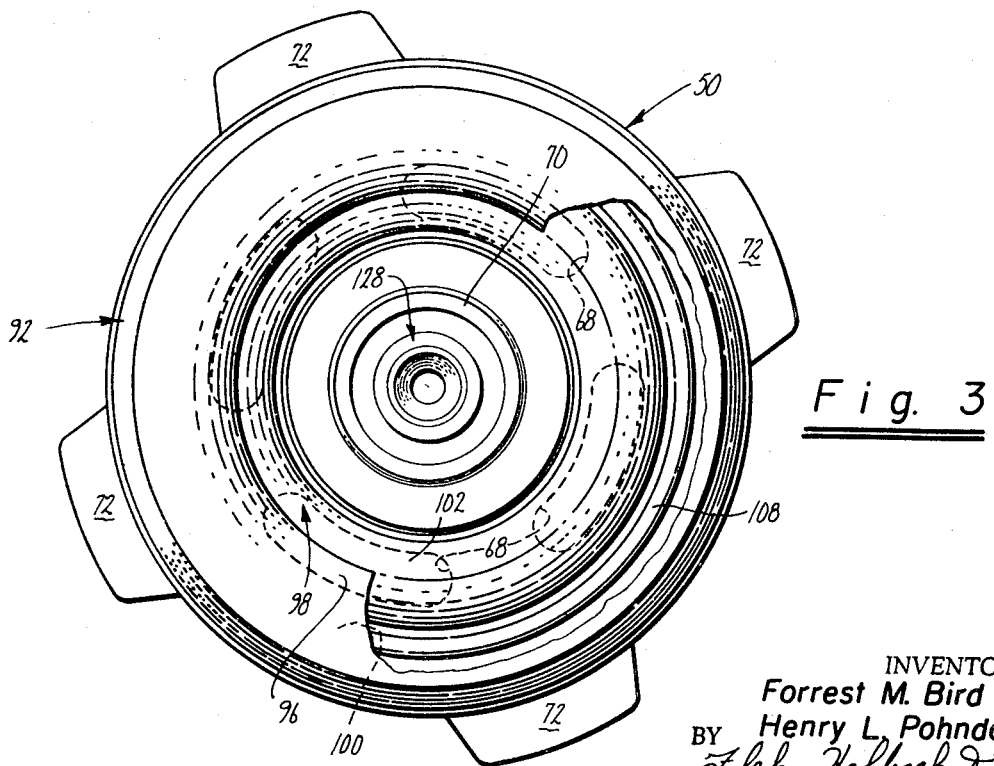
FIG. 3 is a bottom end view of the valve of FIG. 2.

Exhalation bell 50 preferably is of a suitable molded plastic construction comprising a cylindrical main body 64, a web section 66 formed with a plurality of openings 68, shown as four in FIG. 3, for expelling gases during the exhalation phase, and a cylindrical hub 70 adapted for interfitting engagement within the side branch opening of Tee 46 on the breathing head assembly. Bell main body 64 is formed with a plurality of outwardly projecting ears 72 to facilitate manual gripping of the servo valve for assembly and disassembly. An upwardly facing skirt 74 on bell 50 is provided with internal grooves 76 engaging corresponding ridges 78 formed on enlarged cylindrical base section 80 of main housing 48.

Figure 4:
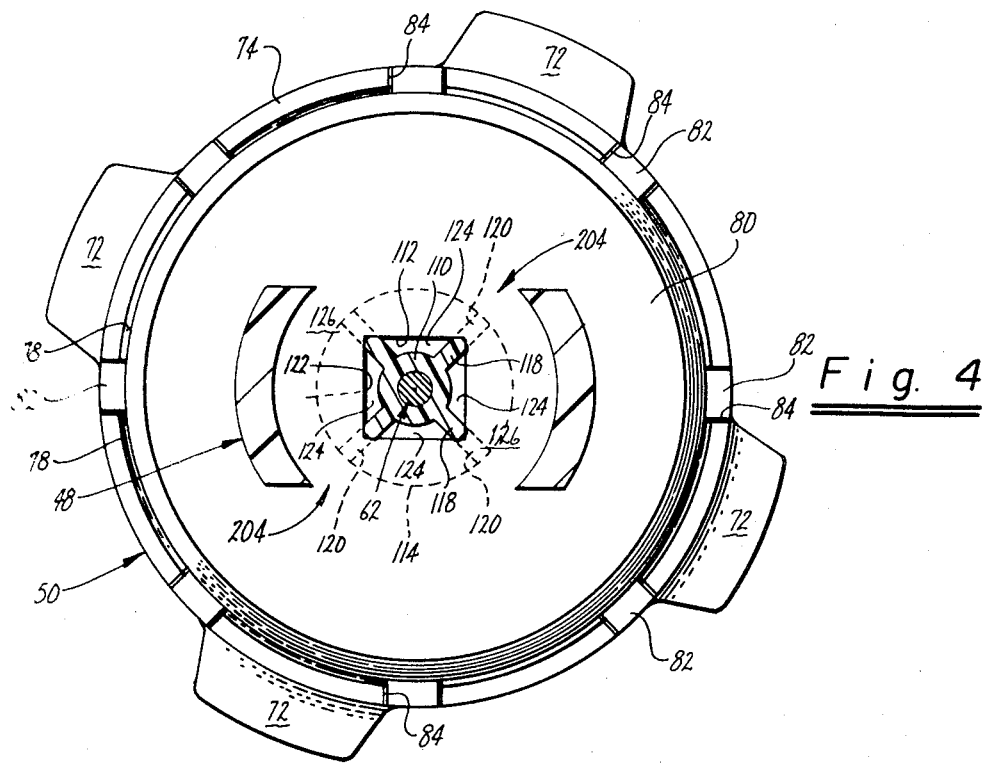
FIG. 4 is a cross sectional view taken along the line 4—4 of FIG. 2.

A plurality of locking lugs 82 formed on the periphery of main body base 80 engage corresponding slots 84 circumferentially spaced along bell skirt 74, as best illustrated in FIG. 4. A master diaphragm 86, molded from a suitable flexible material, is formed with a peripheral bead 88 fitting in a groove 90 formed in bell body 64. Main body base 80 locks in place within bell skirt 74 and presses against diaphragm bead 88 to hold it in place.

A cylindrical condenser 92, preferably of molded plastic, is locked in place over the lower end of bell body 64 by means of resilient deformation over locking rim 94 formed on the periphery of the bell body. Condenser 92 is formed at its lower end with a drippreventing skirt 96 curving inwardly to define an opening 98 for passing exhalation gases to the atmosphere, and a trough 100 for collecting and retaining condensation in the gases.

An annular diaphragm seal or one-way valve 102 is provided to discharge exhalation gases during the expiratory phase, and to seal openings 68 during the inspiratory phase. Diaphragm seal 102 is molded from a suitable flexible material and is formed with an inner bead 104 fitted within a corresponding groove 106 formed around bell cylinder 70. An outer bead 108 on the diaphragm seals against the surface of web section 66 during inhalation, and separates therefrom during exhalation to permit gases to flow through openings 68 and 98 to the atmosphere.

Central shaft 62 extends from control body 52 through main housing 48 and into the chamber of bell body 64. Shaft 62 is mounted for axially sliding movement in concert with four-spline bushing 110 fitted in a square opening 112 formed in a central web portion 113 separating the main housing from the bell body. Bushing 110 is provided with a flange 114 mounted in abutting relationship with a circular plate 116 which is molded to and rigidly supports diaphragm 86. The splines 118 slidably move along a respective corner of square opening 112 for supporting and guiding the axial displacement of central shaft 62. Each spline 118 is formed with an outwardly directed shoulder 120 providing axial spacing between flange 114 and the inner surface of the bell body. This provides a passageway communicating chamber 122 between diaphragm 86 and the bell body with the four openings 124 along bushing 110 which in turn communicate with cavity 126 formed within housing 48. Cavity 126 in turn communicates with the atmosphere through the pairs of side openings 192, 204 provided in housing 48.

The lower end of central shaft 62 is threaded to receive an internally threaded retainer nut 128. The shank 130 of the retainer nut mounts a rotor plate 132 through a lost-motion connection for axial sliding movement between the shoulder of diaphragm 86 and shoulder 134 of the nut. Rotor plate 132 comprises an annular flexible rubber plate 136 formed with a plurality of openings 138 in registry with a circular recess 140 formed within bell web 66. A circular stiffening plate 142 is mounted on hub 144 of the rubber plate to prevent buckling thereof. A plurality of openings 146 are provided in the stiffening plate in registry with openings 138. These aligned openings provide communication from chamber 148 formed between the rotor plate and diaphragm 86, and through cylinder 70 to Tee 46 of breathing head assembly 18. The rotor plate and central shaft are illustrated in FIG. 2 in their positions during an expiratory phase. During an inspiratory phase shaft 62 shifts downwardly, moving rotor plate 132 downwardly to close off openings 68. In this position chamber 148 remains in communication with the Tee of the breathing head assembly through the openings 138 and 146 because plate 136 does not contact the bottom of recess 140 in the furthest extent of its downward travel. It is the pressure within chamber 148 acting against diaphragm 86 which produces the actuating force on central shaft 62 for initiating the expiratory phase, and it is the sub-ambient pressure within chamber 148 which produces a resultant opposite force on the diaphragm and central shaft for initiating the inspiratory phase.

As used herein, the pressure for initiating the inspiratory phase is termed the sensitivity pressure, while the pressure for initiating the expiratory phase is termed the peak inspiratory pressure. These pressures at which phasing is initiated are selectively adjusted by means of respective calibrated sensitivity wheel 150 and calibrated peak inspiratory pressure wheel 152, herein termed the pressure wheel. Both the sensitivity and pressure wheels are mounted for movement with central shaft 62 within cavity 126 of the main housing.

Sensitivity wheel 150 comprises an annular body 154 threadably mounted on externally threaded sensitivity shaft 156 which in turn is mounted on central shaft 62. An annular armature plate 158 of a suitable ferrous metal material is mounted on wheel body 154 and protected from corrosion by means of molded plastic layer 160. A suitable magnet, not shown, may be mounted on the wheel to increase the attraction force from the central magnet. The outer rim 162 of wheel 150 is provided with suitable indicia, such as the numerals 10, 15, 20, and 25 on circumferentially spaced curved surfaces 163, correlated to like numerals on the peak inspiratory pressure wheel to give a normal inspiratory effort of approximately one cm. of water pressure at each setting. A window 164 is provided in housing 48 for visual observation of the indicia indicating the selected sensitivity pressure adjustment, which normally is adjusted to match the numeral on pressure wheel 152. The relative spacing of 150 and 152 from magnet 206 regulates the patient effort to initiate the inspiratory phase.

Pressure wheel 152 is constructed similarly to that of wheel 150 and comprises an annular body 166 threadably mounted on externally threaded pressure shaft 168 which is in turn mounted on central shaft 62. An annular armature plate 170 is mounted on pressure wheel body 166 and a protective layer of plastic 172 is molded over the armature plate. The rim 174 of the pressure wheel is also provided with suitable indicia, such as the numerals 10, 15, 20 and 25 on spaced surfaces 175, indicating peak inspiratory pressures as measured in cm of water pressure. A window 176 is formed in housing 48 for visual observation of the selected indicia on the pressure wheel.

Both sensitivity and pressure shafts 156 and 168 are provided with opposing serrated jaw portions 178, 180 which interlock together during assembly. A shoulder 182 is affixed to central shaft 62 in abutting relationship with the end of pressure shaft 168. Pressure shaft 168, sensitivity shaft 156, bushing 110, and diaphragm plate 116 are locked in assembled relationship on central shaft 62 when retainer nut 128 is turned down over the threaded end of the central shaft. During assembly, the relative angular positioning of shafts 168 and 156 are adjusted to coordinate the relative angular calibration positions of the two wheels 150 and 152.

Figure 6:
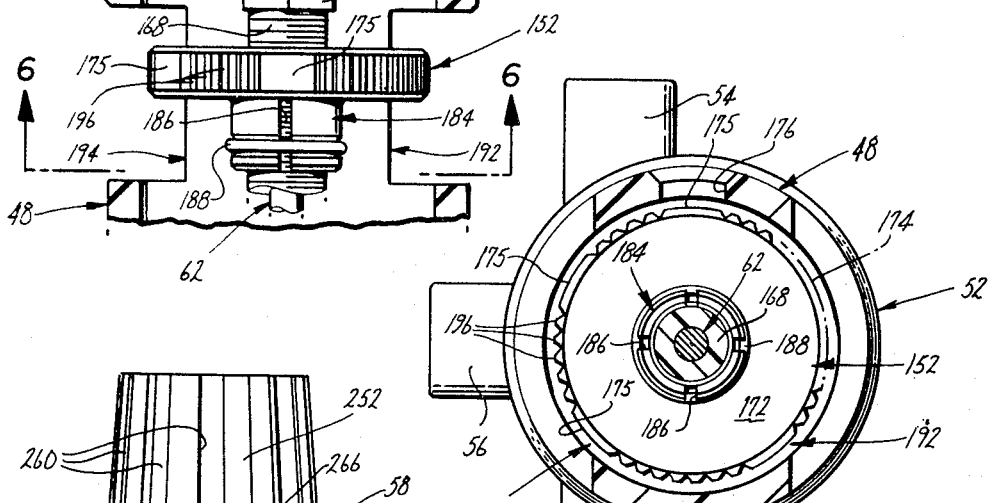
FIG. 6 is a cross sectional view taken along the line 6—6 of FIG. 5.
Figure 7:
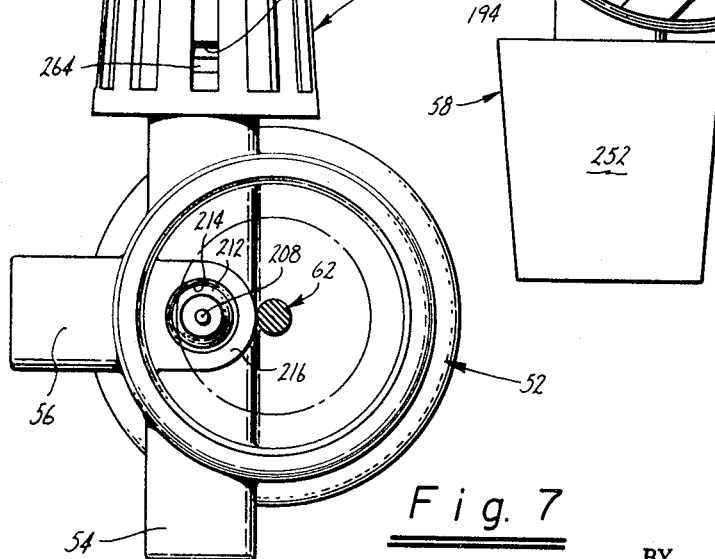
FIG. 7 is a top end view of the valve assembly of FIGS. 2 and 5, with the flanged cap cut-away for clarity.

Pressure wheel 152 is in gripping, frictional engagement with the external threads of pressure shaft 168 by means of slotted hub portion 184, best illustrated in FIGS. 5 and 6. Four slots 186 provide flexing of hub 184 so that a split ring 188, when mounted in retainer groove 190, provides a gripping force normally restraining wheel 152 from rotation with respect to pressure shaft 168. The two diametral segments of wheel 152 project through a pair of opposed openings 192, 194 in main housing 48 providing access for manual finger-tip rotation of the wheel with respect to the threaded pressure shaft and magnet 206. A series of ridges 196 are formed on wheel rim 174 between indicia curved surfaces 175 to assist in gripping the wheel for overcoming the restraining frictional force of slotted hub 184 which is under spring compression. The pressure wheel 152 is then rotated until the desired indicia appears in window 176.

Sensitivity wheel 150 is similarly provided with a slotted hub 200 and split retainer ring 202 for frictional gripping of the wheel with respect to sensitivity shaft 156. The sensitivity wheel is manually adjusted with respect to the sensitivity shaft by means of gripping the wheels through a pair of openings 204 provided in housing 48.

An annular central magnet 206 is mounted within main housing 48 concentric with shaft 62 between the two wheels 150, 152. The magnetic field of magnet 206 attracts the two armature plates 158, 170 in the respective wheels for providing the adjustable threshhold forces required to be overcome by the resultant forces acting against diaphragm 86 to initiate the inspiratory and expiratory phases. Rotation of the wheels 150, 152 axially displaces the corresponding armature plates with respect to central magnet 206 thereby adjusting these threshhold forces, and the resulting differential force for all positions of shaft 62.

Rotation of sensitivity wheel 150 is effective to selectively vary the sensitivity pressure at which the inspiratory phase is initiated. In the operating position illustrated in FIG. 2 armature plate 158 of sensitivity wheel 150 is urged upwardly by the action of magnet 206 thereby providing an upward force against central shaft 62. To initiate the inspiratory phase the resultant force against diaphragm 86 produced by the sub-ambient pressures in cavity 148 plus the magnetic force of armature plate 170 and magnet 206 must overcome the magnetic threshhold force against armature 158. As this threshhold force is overcome and central shaft 62 begins its downward travel the magnetic attraction against armature 158 rapidly diminishes while the attraction force against armature 170 of wheel 152 progressively increases, thus urging shaft 62 to its furthest excursion downwardly.

Similarly, rotation of pressure wheel 152 adjusts the axial position of its associated armature plate 170 with respect to central magnet 206, thereby providing adjustment of the threshhold magnetic force required to be overcome to initiate the expiratory phase. When the positive pressure in chamber 148 produces a resultant force against diaphragm 86 plus the magnetic attraction between armature 158 and magnet 206 sufficient to overcome the magnetic force against armature 170, shaft 62 will start its upward travel with the attractive force against armature 158 gradually increasing so that the central shaft is urged to its furthest excursion upwardly, while at the same time the attractive force against armature 170 markedly decreases.

The thread pitch on respective wheel and shaft pairs for the pressure and sensitivity wheels are selected to obtain the desired axial displacement of each wheel and armature plate with respect to wheel roation and calibration indicia. Thus, the thread pitch for the pressure wheel and pressure shaft was selected in one embodiment to be 28 threads per inch while the corresponding thread pitch for the sensitivity wheel and shaft was 20 threads per inch double lead. This provides a coordination of the pressure adjustments so that the same pressure differential is maintained for a given wheel movement. For example, to adjust the pressure from 10 cm to 15 cm of water for the peak inspiratory pressure the pressure wheel indicia is moved from 10 to 15, and the indicia on the sensitivity wheel is moved from 10 to 15 to maintain the same adjustment in sensitivity pressure.

During initiation of the expiratory phase central shaft 62 is free to move with respect to rotor plate 132 befor retainer nut shoulder 134 engages the plate. With the rotor plate initially seated for closing exhaust opening 68, shaft 62 is in its lowermost position so that retainer nut shoulder 134 is displaced from the rotor plate. As the central shaft begins to move upwardly responsive to the gas pressure reaching the selected peak inspiratory pressure, nut shank 130 slides with respect to rotor plate hub 144. This permits the shaft to build up sufficient speed and momentum effective to dislodge or break the seal of rubber plate 136 against exhaust opening 68. Shaft 62 continues its movement while nut shoulder 134 first abuts against rubber plate and shoulder 144 may abut against central diaphragm portion of diaphragm 86, but rotor 132 is free to travel along the shank between the limits of shoulder 134 and diaphragm 86.

Phase control valve assembly 60 functions to open and close communication between pressurized gas inlet 54 and outlet 56 responsive to axial movement of central shaft 62. Control valve assembly 60 comprises a valve element 208 having an elongated stem and tapered valve head 210. The valve element is slidably mounted in a bore of valve body 212 secured in a recess 214 formed in valve housing 216. The upper end of the valve element stem projects beyond valve body 212 for operating engagement with a flanged cap 218 threadably mounted on the end of central shaft 62, as best shown in FIG. 5. Tapered valve head 210 moves to and from a bore 220 defining a substantially line-contact valve seat. Both valve element 208 and valve body 212 are made of a non-corrosive material, preferably stainless steel, which provides trouble free operation even under adverse moisture conditions which could clog or make the valve operation sluggish, and furthermore simplifies cleaning of the valve.

Valve body 212 is provided with a transverse bore 222 (FIG. 2) communicating with valve seat bore 220 and peripherial groove 224 (FIG. 5). This groove in turn communicates with an opening 226 in valve housing 216 leading to outlet 56. Valve seat bore 220 (FIG. 5) communicates with an internal bore 228 (FIG. 2) leading from axial bore 230 of flow rate control valve assembly 58.

Flow rate control valve assembly 58 is transversely mounted within control body 52, and the control body in turn is provided with a skirt portion 232 having an external ridge for locking engagement with internally grooved stub end 234 of main body housing 48. Flow rate valve assembly 58 comprises a valve element 236 mounted for sliding and rotary movement within valve bore 230. Valve element 236 is formed with a reduced diameter segment 238, a beveled segment 240, and a tapered end segment 242. A bore 244 communicates between inlet bore 246 and valve bore 230, and valve element end 242 slides within bore 244 so that the latter provides a valve seat against beveled segment 240. A groove 248 in the valve element is provided with a seal element 250 preventing loss of gas pressure.

Valve element 236 is moved to and from its seating position to either meter gas flow, or provide an on-off valving function, through operation of manually operated knob 252. Knob 252 preferably comprises a plastic material molded around a nut 254 integrally formed with valve element 236. Internal threads 256 are formed within a central recess of the knob for threading engagement with an externally threaded stub projection 258 integrally formed with control body 52. External fluting 260 is formed on the periphery of the knob to facilitate manual gripping. A split retainer ring 262 of a resilient material such as plastic is provided to retain knob 252 on stub portion 258. Retainer 262 is formed with a pair of diametrically opposed lugs 264 adapted for locking engagement with corresponding openings 266 formed through the knob. An internal shoulder 268 on the retainer functions as a stop against the threads of stub 258 preventing unintended withdrawal of valve element 236. Rotation of knob 252 with respect to the threaded stub 258 advances and withdraws the valve element 236 within bore 230 to open and close communication between inlet 54 and control valve assembly 60.

Valve assembly 58 thus functions as an on-off valve upstream of control valve assembly 60, and at the same time provides a gas flow rate or metering control depending upon displacement of valve element 236 relative to the valve seat. Control of the gas flow rate in this manner determines the length and depth of the inspiration. Thus, if valve element 236 is turned in to close the valve off slightly and reduce the flow rate the inspiratory phase time would be increased to thereby increase the depth of inspiration by the patient. Similarly by opening the valve the flow rate is increased so that the inspiratory phase is shortened and less gas volume is delivered to the patient. Suitable indicia, not shown, may be engraved on the base of knob 252 for indicating flow rate with respect to knob position.

The operation and use of the respiratory apparatus is as follows: Let it be assumed that the apparatus is to be used in the home by a patient requiring treatment for a lung condition such as asthma, emphyzema, bronchitis and the like. Compressor 12 is energized and primary flow rate and relief valve assembly 14 is adjusted for delivering the proper rate of flow of pressurized air through tubing 34 into inlet 54 of the servo control valve 16. In the breathing head assembly 18 shown in the drawings, a mouthpiece 26 is provided for insertion into the mouth of a patient. It is understood that other patient adapters can be utilized, such as a mask or a tracheotomy fitting, for connecting the breathing head assembly to the physiological airway of the patient.

Let it be assumed that the elements of servo control valve 16 are initially in position illustrated in FIG. 2. Flow control valve 58 is opened by turning knob 252 to the desired position displacing valve element 236 for opening communication with inlet bore 246. At this point the gas pressure in bore 228 urges valve element 208 of control valve assembly 60 to a closed position precluding gas exit into outlet 56. Central shaft 62 is initially in its raised position releasing rotor plate 132 so that diaphragm seal 102 is free to open for exhausting expiration gases into the atmosphere.

The peak inspiratory pressure is adjusted by fingertip rotation of pressure wheel 152 until the desired indicia appears in window 176. Assuming that the indicia "15" is selected, wheel 152 automatically positions its associated armature 170 so that, with central shaft 62 shifted to its lowermost position, a predetermined magnetic attraction force is produced by magnet 206 requiring a positive pressure of 15 cm. water within chamber 148 plus force of attraction between sensitivity armature plate 158 and magnet 206 when wheel 150 is also set at 15, to overcome this magnetic force and shift central shaft 62 upwardly.

The sensitivity pressure at which the inspiration phase is initiated is next adjusted through a finger-tip rotation of sensitivity wheel 150 until the indicia appearing in window 164 matches the pressure setting, or 15 in this case. This then obtains a 1 cm. water inspiratory effort and the armature plate 158 is automatically displaced to a predetermined position with respect to central magnet 206 at which the required magnetic attraction force is produced requiring a sub-ambient pressure of 1 cm. water within chamber 148 plus force of attraction between pressure armature plate 170 and magnet 206 when wheel 152 is also set to 15, to overcome this magnetic force and shift central shaft 62 downwardly.

While the foregoing adjustment has been described in relation to a vertical positioning of servo control 16 in relation to breathing head assembly 18, i.e. in the 12 o'clock position as shown in FIG. 1, the respiratory unit can be shifted about its longitudinal axis for further adjustment of the peak inspiratory pressure through the effect of gravity on the moving elements. Thus, in the 12 o'clock position the force of gravity is acting upon central shaft 62 and its associated elements to reduce the resultant force required for initiating the sensitivity pressure operation, and to increase the resultant force required for initiating the peak inspiratory pressure operation. Mouthpiece 26 would be turned relative to Tee 46 to maintain it level in these various positions.

If the breathing head assembly is shifted to the 3 o'clock position with the central shaft substantially horizontal, the weight of the moving elements has no effect on either the peak inspiratory pressure or sensitivity pressure.

If the breathing head assembly is shifted to the 6 o'clock position, the force of gravity will be in the opposite direction to aid the force attracting the armature of the sensitivity wheel, thus increasing the effective sensitivity pressure adjustment, and to reduce the resultant force acting on the armature of the pressure wheel thus reducing the effective peak inspiratory adjustment.

Compensatory or other adjustments may be made in any event to independently vary sensitivity and inspiratory pressures and flow rate to accommodate individual requirements.

Where it is desired to adjust the relative calibrations of the two wheels 150 and 152 so that the sensitivity and peak inspiratory pressures are coordinated with respect to wheel positions, the sensitivity and pressure shafts 156, 168 are angularly indexed, before assembly, to the desired position with jaws 178, 180 interlocking. The elements are then reassembled on central shaft 62 and locked in place by retaining nut 128.

Next assume that an exhalation phase has just been completed so that diaphragm seal 102 has returned to the position illustrated in FIG. 2 sealing off openings 68 from the atmosphere. For the patient to commence inhalation he draws in a little air through mouthpiece 26 reducing the pressure in Tee 46, cylinder 70, and chamber 148 through the openings in rotor plate 132, down to sub-ambient levels. Since the pressure in chamber 122 communicates to atmosphere through the openings around four-spline bushing 110 and the openings provided in main housing 48, a resultant force is produced on diaphragm 86 tending to urge the central shaft downwardly. The differential pressure on the diaphragm gradually increases until it combines with the magnetic attraction between armature 170 and magnet 206 to overcome the attraction between the magnet 206 with armature 158 of sensitivity wheel 150. Then the movement of shaft 62 carries rotor plate 132 downwardly until plate 136 closes openings 68. In addition, it should be pointed out that gate valve 22 is closed during the exhalation phase thereby permitting a slightly negative pressure within Tee 46 of the breathing head assembly to permit initiation of the inspiratory phase. Thus, both gate valve 22 and diaphragm seal 102 separate the main passageway of the breathing head assembly from atmosphere.

As central shaft 62 shifts downwardly upon initiation of the inspiratory phase flanged cap 218 urges valve element 208 to an open position. This communicates gas under pressure from inlet 54 past flow rate control valve 236 and past valve head 210 and the openings in valve body 212 which communicate with outlet 56. Air under pressure is then delivered through tubing 38 and Tee 40 which divides the flow with a part going through nozzle 44, venturi 20, and gate valve 22, and a part into nebulizer 24 which nebulizes liquid particles for delivery in the main stream of air to the patient.

As the inspiratory phase continues pressure builds up in the main stream passages as the patient's lungs are filled. This pressure is communicated through cylinder 70, rotor plate openings 138, and into chamber 148. Rubber plate 136 closes off openings 68 throughout the inspiratory phase preventing escape of gases.

When the gas pressure in the respirator builds up to the preselected peak inspiratory pressure of, for example, 15 cm water above ambient the servo valve shifts to initiate the expiratory phase. This pressure acts within chamber 148 against diaphragm 86 producing a resultant upward force which combines with the magnetic attraction between armature 158 and magnet 206 to overcome the magnetic attraction force between magnet 206 and armature 170 of pressure wheel 152. As soon as this force is overcome central shaft 62 begins to move and acts as a shuttle valve which rapidly shifts upwardly as the magnetic attractive force between magnet 206 and the armature of sensitivity wheel 150 increases. Initial movement of central shaft 62 builds up speed and momentum before retainer nut shoulder 134 strikes rotor plate 132. This momentum is effective to break the seal of plate 136 against openings 68, and the rotor plate is then moved along with the central shaft to the furthest extent of its travel permitting exhaust gases to flow through openings 68, past diaphragm seal 102, and through skirt opening 98 to atmosphere. Any moisture in the exhaust gases tends to condense on condenser member 92 for collection in trough 100 and subsequent removal. At the same time that central shaft 62 shifts upwardly flanged cap 218 disengages from valve element 208 of control valve assembly 60. This permits the pressurized gas within bore 228 to act against valve head 210 and urge it to its closed, seated position shutting off flow to the breathing head assembly. Valve 208 remains closed throughout this expiratory phase.

It should also be recognized that flange cap 218 may be operated manually to open and close valve element 208 and thereby control the inspiratory and expiratory phases for resuscitation of an unconscious patient.

The respiratory apparatus of the foregoing embodiment will perform satisfactory in hyperbaric chambers at several atmospheres of pressure above ambient, and equally well in rarified atmospheres such as may be found in unpressurized aircraft cabins at high altitudes without the requirement of making compensatory adjustments in the sensitivity and pressure controls.

Figure 8:
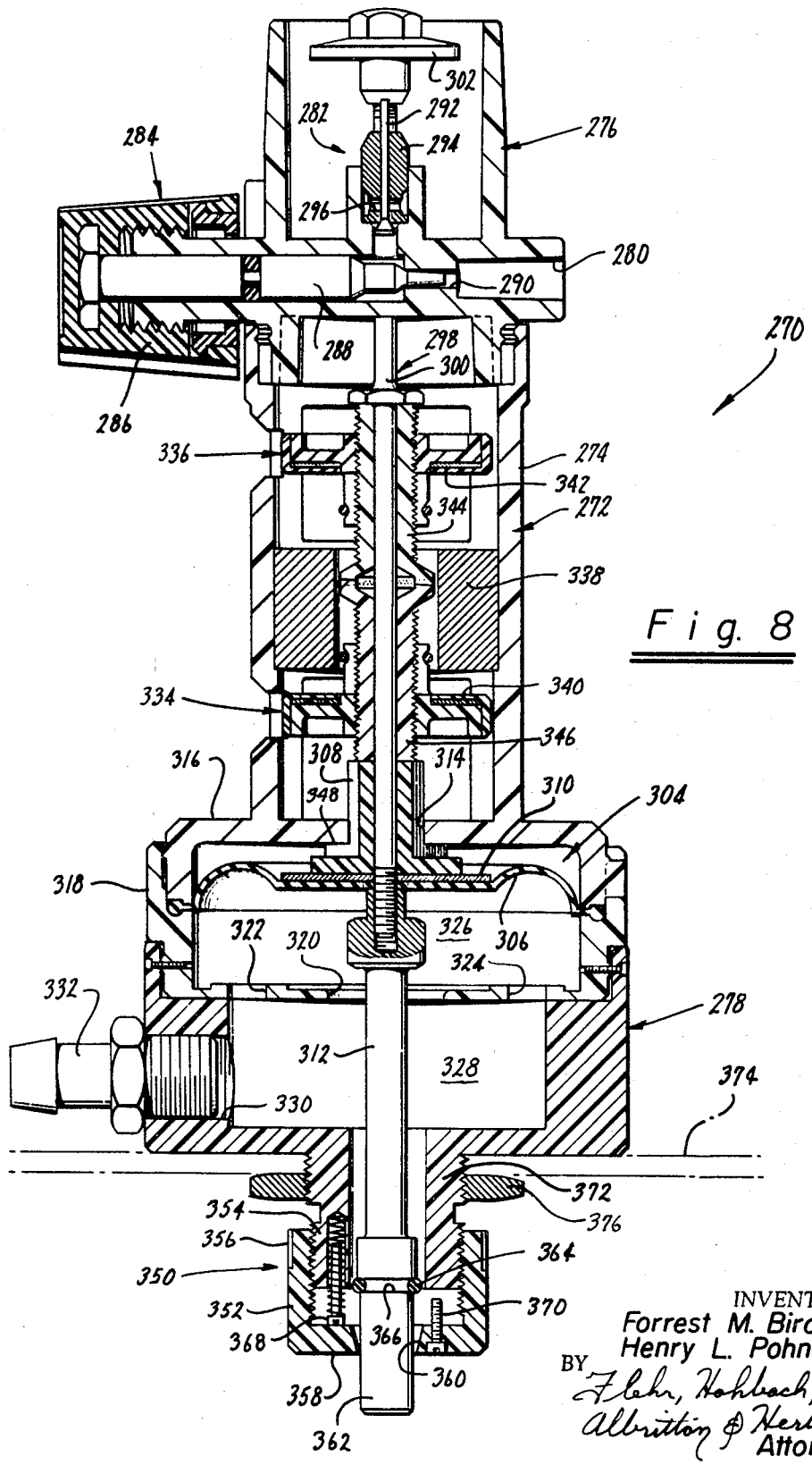
FIG. 8 is an axial section view similar to FIG. 2 illustrating another embodiment of the invention.

Referring to FIG. 8 another embodiment of the invention is illustrated generally at 270. Apparatus 270 has application for use in cardiopulmonary therapy with a breathing head assembly and source of compressed air of the type described above. Such a breathing head assembly would comprise a nebulizer, exhalation valve and mouthpiece provided in a relatively lightweight portable unit for hand-held use to ventilate the patient's physiological airway. These breathing head assemblies are interchangeable affording multiple-patient use of individual breathing head assemblies with a single apparatus 270 of the invention.

Apparatus 270 comprises a valve body 272 defined by main housing 274, control body assembly 276, and at its lower end a bell housing 278. Control body assembly 276 comprises an inlet 280 adapted for connection by suitable tubing to the source of pressurized gas, and an outlet, not shown, located downstream of phase control valve assembly 282 to direct the outflow of gass through suitable tubing to the breathing head assembly. The rate of gas flow from inlet 280 into valve assembly 282 is controlled by metering valve assembly 284.

The construction and operation of the breathing head assembly, phase control valve assembly 282, and metering valve assembly 284 are similar to that described for the embodiment of FIGS. 1–7. Suffice it to say here that manual turning adjustment of metering valve assembly knob 286 displaces valve element 288 to meter flow through inlet bore 290. Control valve assembly 282 comprises a relatively small, stainless steel valve element 292 having a tapered valve head movable to and from the seat of valve body 294 to cycle on or off the flow of gas through outlet passage 296 leading to the outlet connection.

Valve element 292 is urged to its open position by valve operating means 298 comprising a master or central shaft 300 axially slidable within housing 274 and provided at its upper end with a flanged cap 302 which moves downwardly to strike the end of the valve element projecting outwardly from valve body 298. Movement of the master shaft in the opposite direction displaces the cap from the valve element permitting the latter to close from the action of the gas pressure. When valve element 292 is urged downwardly into its open position gas flows to the breathing assembly to initiate the inspiratory phase, and when the valve element moves to its closed position the expiratory phase is initiated.

Valve operating means 298 is displaced for cycling by pressure responsive means 304 comprising a flexible master diaphragm 306 secured on the end of the master shaft between a four-spline bushing 308 and circular plate 310 on one side and the internally threaded end of extension shaft 312 on the other side. Translatory movement of the master shaft is guided by bushing 308 as it slides through a square opening 314 provided in cylindrical base 316. The beaded outer periphery of the diaphragm is retained in place by means of a snap-on cylindrical housing 318 provided at its outer end with a central opening 320 around extension shaft 312. A plurality of openings 322, 324 are formed in the end wall of housing 318 providing pressure communication into chamber 326 adjacent the diaphragm from outer chamber 328 which in turn communicates through a side port 330 for pressure sensing with the airway of the patient. Suitable tubing, not shown, is connected at one end with fitting 332 and at the other end with, for example, the mainstream passage in a breathing head assembly.

The sensitivity and inspiratory pressure settings for cycling the inspiratory and expiratory phases are selectively adjusted by means of respective sensitivity wheel assembly 334 and pressure wheel assembly 336. An annular, central magnet 338 is mounted between the two wheels and creates a magnetic field for attracting metal armature 340 carried on wheel 334 and metal armature 342 carried on wheel 336. At any position of master shaft 300 the resultant force of the magnetic field acting on the two armatures, together with the resultant force from the pressure differential acting on diaphragm 306, and gravity forces acting on the elements depending upon angular positioning from the horizontal of the apparatus, urges the shaft either to its first position for switching valve assembly 282 on, i.e. to the lowermost position of FIG. 1, or to its second position permitting valve assembly 282 to switch off, i.e. the illustrated uppermost position of shaft 300.

Relative axial adjustment of the two wheels 334, 336 to vary the magnetic forces is adjusted through manual finger-tip turning of the wheels along threaded shafts 344, 346 in the manner described above for unit 10. A shoulder 348 on shaft bushing 308 provides a fixed stop against the inner side of housing 316 to limit upward excursion of the master shaft for the off cycle. In this position spontaneous starting effort is determined primarily by the distance of sensitivity wheel 334 from the magnetic, and to a lesser extent by the distance from the magnet of pressure wheel 336. For a certain selected axial setting of the two wheels a predetermined sub-ambient pressure of, for example, one cm. water within chamber 326 communicated from the patient's airway produces a resultant force downward against diaphragm 306 shifting the master shaft downwardly to urge valve element 292 to open position.

Stop means 350 provides a fixed stop to limit the outward translatory movement of the master shaft during the on cycle of the valve. This stop means comprises a calibrated knob or cap 352 having an internal cavity in threaded engagement with external threads formed on stub projection 354 of housing 278. These external threads have the same thread pitch as the threads for shaft 344 of pressure wheel 336. Knob 352 is calibrated with suitable spaced indicia, not shown, formed on the outer periphery 356 of the knob to provide visual indication of the cardinal numbers for the peak inspiratory pressure limit settings, for example, 10, 15, 20 and 25 cm. of water pressure. An end member 358 of the cap is formed with a central opening 360 having inwardly diverging peripheral sidewalls. Distal end 362 of the shaft extension projects through this opening to facilitate manual cycling of the respirator. Detent means comprising an O-ring 364 seated in groove 366 on the shaft extension is provided to jamb or stop against opening 360 and limit the outward excursion of the master shaft. Turning adjustment of knob 352 varies the axial position of opening 360 with respect to the control valve body and thereby varies the position of this stop. A plunger 368 seated in stub projection 354 is spring-loaded in an outward direction for frictional engagement against the inner surface of the end cap. This friction acts to stabilize movement of knob 352 in any selected position. A set screw 370 projects inwardly from the cap and limits rotation of the knob to less than 360 degrees when it turns in registry with plunger 368.

A shoulder 372 on housing 278 is provided with external threads for insertion through a wall 374 of, for example, up to one-eighth inch thickness allowing the apparatus to be panel mounted with jamb-type locking nut 376.

The use and operation of respiratory apparatus 270 are as follows. Assume that the inlet and outlet of control body assembly 276 are connected respectively to a gas pressure source and breathing head assembly while fitting 332 of the bell housing side port is connected to sense the pressure of the mainstream gases to the patient's airway. The apparatus is calibrated by turning the sensitivity and pressure wheels 334, 336 to their highest desired operation values. Pressure wheel 336 is then adjusted to move it back-and-forth until the peak inspiratory pressure readings are synchronized with the calibrations on knob 352. This is accomplished without moving sensitivity wheel 334 from its original calibration.

Let it be assumed that the elements of apparatus 270 are initially in the position illustrated in the drawing. Valve element 288 of the metering valve assembly is adjusted by turning knob 286 to the desired position for a selected gas-flow rate. At this point gas pressure is urging valve element 292 of control valve assembly 282 to its closed position. For the patient to commence inhalation he draws in air through the mouthpiece of the breathing head assembly which communicates a reduction in pressure through bell side port 330, chamber 328 and chamber 326 so that atmospheric pressure acts against diaphragm 306. When the resultant pressure forces acting on the diaphragm, together with the force of magnetic attraction on the armature of pressure wheel 336, overcomes the opposite magnetic force acting on sensitivity wheel 334, master shaft 300 is shifted downwardly to its first position carrying with it cap 302 which urges valve element 292 to its open position. Master shaft 300 continues its outward excursion until detent means 364 stops against cap opening 360. Gas now flows under pressure through control valve assembly 282 into the breathing head assembly for the inhalation phase. The breathing head assembly is provided with a gate valve which opens during this phase to admit gas through the nebulizer and mouthpiece for delivery to the airway of the patient.

As the inspiratory phase continues pressure builds up in the mainstream passages as the patient's lungs are filled. This pressure is communicated back through bell side port 330 into chambers 328 and 326 where it acts against diaphragm 306. Master shaft 300 will shift backward to its second position for initiating the exhalation phase when the resultant force acting on the diaphragm, together with the magnetic force attracting the armature of sensitivity wheel 334, overcomes the magnetic force attracting the armature of pressure wheel 336. The exact position at which knob 352 stops the outward excursion of the master shaft determines the resultant of the magnetic forces acting on the two armatures and thereby determines the limit at which the inspiratory pressure builds up to shift the master shaft against these forces.

It is important to note that adjustment of knob 352 for varying the peak inspiratory pressure limit setting does not alter the previously established sensitivity pressure setting so that sensitivity pressure settings remain constant as the inspiratory pressure limits are changed throughout the entire operational range. As knob 352 is turned to move the stop of opening 360 outwardly, pressure wheel 336 in the "on" stop position moves closer to the strong side of the magnetic, increasing the clutching or valve shifting forces and raising the inspiratory positive pressure limit. With both the pressure and sensitivity wheels on a common shaft a proportional movement is created in reciprocal directions during any translatory movement of the master shaft between stops. Thus, as "on" cycle forces on the armatures are increased, "off" cycle forces are decreased. Similarly, when knob 352 is turned in a direction moving the stop of opening 360 inwardly pressure wheel 336 is moved further from the strong side of the magnetic during the "on" phase, decreasing the clutching force and lowering the inspiratory positive pressure limit. Again, both pressure and sensitivity wheels are moved a proportionate amount so that a given sensitivity pressure setting for the "off" cycle position is not altered.

It can be seen from the foregoing that there has been provided in each embodiment a light weight, portable, reliable, ethical respiratory apparatus which can readily be utilized in the home, hospitals or clinics. It can be readily disassembled, sterilized, and then reassembled by relatively unskilled personnel. Simplified sensitivity and peak inspiratory controls are provided which can easily be adjusted by finger-tip operation. A single, central magnet between a pair of axially adjustable armature plates on the sensitivity and pressure adjustment wheels provide accurate calibration of these pressures. Further adjustment of these pressures may be obtained by merely adjusting the angular position of the breathing head assembly with respect to the horizontal. The relative calibrations for the sensitivity and pressure wheels may be coordinated by means of adjusting a pair of interlocking externally threaded shafts mounted on a central shaft. The thread pitch of the two shafts are formed so that equal incremental adjustments of the two wheels maintains the same pressure differential for both sensitivity pressure and peak inspiratory pressure. The parts are formed in a manner tending to preclude sluggish or inoperable conditions. The servo control valve includes a non-corrosive valve element adapted to function even if moisture from the compressed air collects on the valve, or if the valve elements are improperly dried after sterilization. A combined flow control and on-off valve is provided upstream of the servo control valve. The length of the inspiratory phase may be adjusted by regulation of this flow control valve. In another embodiment a single gas control device usable with interchangeable breathing head assemblies provides independent adjustment of sensitivity and peak inspiratory pressure level settings.

While the embodiments herein are at present considered to be preferred, it will be understood that numerous variations and modifications may be made therein by those skilled in the art, and it is intended to cover in the appended claims all such variations and modifications as fall within the true spirit and scope of the invention.

I claim:

1. In a respiratory apparatus having an inspiratory phase and an expiratory phase in its operative cycle, the combination including: a control valve body having an inlet adapted to be connected to a source of gas under pressure, an outlet for communicating a mainstream flow of gas to the airway of a patient, and a valve seat between said inlet and outlet; a valve element movable from an open position spaced from the valve seat to establish communication between the inlet and outlet for the inspiratory phase, and to a closed position occluding said valve seat to interrupt said communication between the inlet and outlet for the expiratory phase; valve operating means including a shaft having a large mass relative to the mass of said valve element, said shaft being movable between a first position to strike said valve element and urge the same to its open position, and to a second position releasing said valve element permitting movement thereof to its closed position, said valve operating means including pressure responsive means urging said shaft between said first and second positions responsive to pressure of the gas communicating with the airway of the patient; a magnet mounted within said valve body; sensitivity pressure adjusting means including an armature spaced from one end of the magnet and creating a magnetic force therewith tending to urge the shaft to its second position, sais sensitivity adjusting means including means to vary said magnetic force for adjusting the sensitivity pressure in the pressure responsive means which is effective to move the shaft to the first position; and, peak inspiratory pressure adjusting means including an armature spaced from the opposite end of the magnet and creating a magnetic force therewith tending to urge the valve operating means to its first position, said peak inspiratory adjusting means including means to vary said magnetic force for adjusting the peak inspiratory pressure in the pressure responsive means which is effective to move the shaft to the second position.

2. In a respiratory apparatus having an inspiratory phase and an expiratory phase in its operative cycle, the combination including: a control valve body having an inlet adapted to be connected to a source of gas under pressure and an outlet for communicating a mainstream flow of gas to the airway of a patient; a valve element movable between an open position establishing communication between the inlet and outlet for the inspiratory phase, and to a closed position interrupting said communication between the inlet and outlet for the expiratory phase; valve operating means including an axially sliding shaft mounted in said control valve body, said shaft being movable between a first position urging said valve element to its open position, and to a second position releasing said valve element permitting movement thereof to its closed position, said valve operating means further including pressure responsive means comprising diaphragm means in operating relationship with said shaft and defining a chamber in communication with said mainstream flow to the patient, said chamber being provided with openings for exhausting gases to atmosphere during said expiratory phase, and to close said chamber during the inspiratory phase, and including one-way valve means allowing only exhaust flow through said openings from the chamber, said shaft including a stub portion extending into the chamber together with valve means slidably mounted on said shaft stub portion within the chamber to close said chamber openings during the inspiratory phase; lost-motion connection means between said valve means and shaft stub portion, said lost-motion connection means being arranged to provide a first excursion of said shaft stub portion upon initiation of said expiratory phase without moving said valve means from its closed position with said openings, and a second excursion of said shaft stub portion moving said valve means to its closed position after said shaft builds up momentum; sensitivity pressure adjusting means including an armature spaced from one end to the magnet and creating a magnetic force therewith tending to urge the valve operating means to its second position, said sensitivity adjusting means including means to vary said magnetic force for adjusting the sensitivity pressure in the pressure responsive means which is effective to move the valve operating means to the first position; and, peak inspiratory pressure adjusting means including an armature spaced from the opposite end of the magnet and creating a magnetic force therewith tendin to urge the valve operating means to its first position, said peak inspiratory adjusting means including means to vary said magnetic force for adjusting the peak inspiratory pressure in the pressure responsive means which is effective to move the valve operating means to the second position.

3. In a respiratory apparatus having an inspiratory phase and an expiratory phase in its operative cycle, the combination including: a control valve body having an inlet adapted to be connected to a source of gas under pressure and an outlet for communicating a mainstream flow of gas to the airway of a patient; a valve element movable from an open position establishing communication between the inlet and outlet for the inspiratory phase, and to a closed position interrupting said communication between the inlet and outlet for the expiratory phase; valve operating means movable between a first position urging said valve element to its open position, and to a second position releasing said valve element permitting movement thereof to its closed position, said valve operating means including pressure responsive means urging said valve operating means between said first and second positions responsive to pressure of the gas communicating with the airway of the patient; a magnet mounted within said control valve body adjacent said valve operating means; sensitivity pressure adjusting means including an armature spaced from one end of the magnet and comprising a body of metal for creating a magnetic force with said magnet, said metal body being mounted for movement with said valve operating means and tending to urge the valve operating means to its second position, said sensitivity adjusting means including means to vary said magnetic force for adjusting the sensitivity pressure in the pressure responsive means which is effective to move the valve operating means to the first position; and, peak inspiratory pressure adjusting means including an armature spaced from the opposite end of the magnet and comprising a body of metal for creating a magnetic force with said magnet, said metal body being mounted for movement with said valve operating means and tending to urge the valve operating means to its first position, said peak inspiratory adjusting means including means to vary said magnetic force for adjusting the peak inspiratory pressure in the pressure responsive means which is effective to move the valve operating means to the second position.

4. The invention of claim 3 and further characterized in that said means to vary the magnetic force for said sensitivity adjusting means includes a first externally threaded shaft mounted for movement with said valve operating means, said sensitivity adjusting means includes a sensitivity wheel threadably mounted on said shaft for axial displacement upon rotation thereof, said means to vary the magnetic force for the pressure adjusting means includes a second externally threaded shaft mounted for movement with the valve operating means, and said pressure adjusting means includes a pressure wheel threadably mounted on said shaft for axial displacement upon rotation thereof.

5. The invention of claim 4 and further characterized in that means are provided to releasably hold both the sensitivity adjusting means wheel and pressure adjusting means wheel against relative rotation with respect to the respective threaded shafts.

6. The invention of claim 4 and further characterized in that the first and second threaded shafts are formed with respective selective thread pitches effective to establish a fixed differential in magnetic force of inspiratory effort when said sensitivity and pressure wheels are rotated to preselected positions.

7. The invention of claim 6 and further including releasable jaw means to constrain said first and second shafts against relative rotation, said jaw means upon release adapted to permit relative rotation of said shafts to provide selective adjustment of the said fixed differential.

8. For use in a respiratory apparatus having a source of pressurized air, means to control the rate of air flow from the source of air pressure, and a breathing head assembly adapted to provide a mainstream flow of said air to a patient, the combination including: a servo control valve body mounted on said breathing head assembly, said valve body including an inlet in communication with said source of air pressure and an outlet in communication with said mainstream flow in the breathing head assembly; phase control valve means mounted with said body and including a valve element movable to an open position to direct air flow between the inlet and outlet for an inspiratory operating phase, and to a closed position closing said communication during an expiratory operating phase; shaft means mounted in said body for movement between a first position urging said valve element to its open position, and to a second position releasing said valve element for movement thereof to its closed position, said shaft means being positioned in said body out of the gas flow circuit between said inlet and outlet; expansible chamber means in communication with said mainstream of the breathing head assembly and operable to move said shaft means to its first position responsive to a predetermined sensitivity pressure in said mainstream flow to initiate said inspiratory phase, and further operable to move the shaft means to its second position responsive to a predetermined peak inspiratory pressure in said mainstream to initiate said expiratory cycle.

9. The invention of claim 8 and further characterized in that said expansible chamber includes one-way valve means to direct exhalation gas from said mainstream passage to the atmosphere through the chamber, second valve means to occlude said exhaust one-way valve means during the inspiratory phase, and valve operating means on the shaft means operably connected with said second valve means to move the latter to open position during the expiratory phase.

10. The invention in claim 9 and further characterized in that the shaft means includes a shaft end extending into the expansible chamber, said second valve means being slidably mounted on said shaft end, and said shaft end including a valve operating projection engaging the second valve means after an initial excursion of the shaft means.

11. The invention of claim 8 and further characterized in that said phase control valve means includes a valve body provided with a valve bore communicating between said inlet and outlet, one end of said valve bore defining a valve seat, and said valve element is slidably mounted in said valve bore and includes a valve head seating against said valve seat in the closed position of the valve element.

12. The invention of claim 11 and further characterized in that said valve element head defines an outwardly flaring end providing a substantially line-contact engagement with said valve seat, said air pressure from the inlet acts against said valve head to urge the valve element to its closed position during said expiratory phase.

13. The invention of claim 11 and further characterized in that said valve element includes an elongate stem having an end projecting from said valve body, said shaft means including a valve operating member in registry with said valve stem to move the valve element to its open position when the shaft means moves to its first position, and to move out of registry with the valve stem in the second position of the shaft means whereby air pressure from the inlet is effective to urge the valve element to its closed position.

14. In a respiratory apparatus having an inspiratory phase and an expiratory phase in its operative cycle, the combination including a control valve body having an inlet adapted to be connected to a source of gas under pressure and an outlet for communicating a mainstream flow of gases to the airway of a patient, a valve element movable from an open position establishing communication between the inlet and outlet for the inspiratory phase, and to a closed position interrupting said communication between the inlet and outlet for the expiratory phase, valve operating means movable between a first position urging said valve element to its open position, and to a second position releasing said valve element permitting movement thereof to its closed position, said valve operating means including pressure responsive means urging said valve operating means between said first and second positions responsive to pressure of the gas communicating with the airway of the patient, means in the valve body creating a magnetic field, sensitivity pressure adjusting means urging the valve operating means to its first position responsive to said magnetic field, and means in association with said valve operating means to selectively limit the excursion of the same toward said first position and thereby selectively vary the limit of peak inspiratory pressure.

15. In a respiratory apparatus as in claim 14 wherein the valve operating means includes an extension at one end thereof, and said means limiting the excursion of the valve operating means includes an end member positioned to limit the outward excursion of the valve operating extension together with means to selectively vary said position of the end member with respect to the valve operating means.

16. A respiratory apparatus as in claim 15 wherein the valve operating means extension projects from an end of the valve body, and the end member comprises a cap mounted on the valve body and being formed with a central opening through which the extension projects to facilitate manual grasping thereof for manual cycling of the control valve.

17. A respiratory apparatus as in claim 15 wherein the end member comprises a cap threadably mounted on the valve body whereby selective turning of the cap varies the displacement thereof with respect to the extension of the valve operating means.

18. A respiratory apparatus as in claim 17 in which the cap is formed with a central opening through which said extension projects, and an annular detent is provided on said extension for engagement with the cap adjacent said opening to limit said outward excursion of the valve operating means.

19. A respiratory apparatus as in claim 18 in which said cap central opening is formed with an inwardly diverging walls and said annular detent comprises an O-ring mounted on said extension and adapted for engaging the opening walls to limit outward excursion of the valve operating means.

20. A respiratory apparatus as in claim 14 in which the sensitivity pressure adjusting means comprises a first armature mounted on the valve operating means and axially adjustable therewith to selectively vary its attraction force from the magnetic field, and the inspiratory pressure adjusting means comprises a second armature mounted on the valve operating means and axially adjustable therewith to selectively vary its attraction force from the magnetic field.

21. A respiratory apparatus as in claim 20 including a magnet creating said magnetic field, the magnet being positioned in the valve body between said first and second armatures.

22. A respiratory apparatus as in claim 14 wherein said pressure responsive means is adapted for branch connection with the mainstream flow of gases in a breathing head assembly connectable with a patient's airway.

* * * * *